United States Patent
Ryu et al.

(10) Patent No.: US 9,214,257 B2
(45) Date of Patent: Dec. 15, 2015

(54) ORGANIC ELECTROLYTE FOR MAGNESIUM BATTERIES AND MAGNESIUM BATTERY USING THE ORGANIC ELECTROLYTE

(71) Applicant: SAMSUNG ELECTRONICS CO., LTD., Suwon-si, Gyeonggi-do (KR)

(72) Inventors: Young-gyoon Ryu, Suwon-si (KR); Seok-soo Lee, Yongin-si (KR); Dong-jun Lee, Seoul (KR); Myung-jin Lee, Seoul (KR); In-sun Jung, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 301 days.

(21) Appl. No.: 13/800,925

(22) Filed: Mar. 13, 2013

(65) Prior Publication Data
US 2013/0209894 A1    Aug. 15, 2013

(51) Int. Cl.
| | |
|---|---|
| H01B 1/20 | (2006.01) |
| H01M 10/0564 | (2010.01) |
| H01M 10/0568 | (2010.01) |
| H01M 10/054 | (2010.01) |
| H01M 4/46 | (2006.01) |

(52) U.S. Cl.
CPC ............ *H01B 1/20* (2013.01); *H01M 10/054* (2013.01); *H01M 10/0564* (2013.01); *H01M 10/0568* (2013.01); *H01M 4/466* (2013.01); *H01M 2300/0025* (2013.01)

(58) Field of Classification Search
CPC ............ H01M 10/052; H01M 10/054; H01M 10/0564; H01M 10/0568; H01B 1/20
See application file for complete search history.

(56) References Cited

U.S. PATENT DOCUMENTS

| | | | |
|---|---|---|---|
| 2009/0068568 A1* | 3/2009 | Yamamoto et al. | 429/340 |
| 2011/0159381 A1* | 6/2011 | Doe et al. | 429/337 |

FOREIGN PATENT DOCUMENTS

| | | |
|---|---|---|
| JP | 2004-265785 A | 9/2004 |
| JP | 2007-197370 A | 8/2007 |

OTHER PUBLICATIONS

Guo, Y. et al., Study of electronic effect of Grignard reagents on their electrochemical behavior, Electrochemistry Communications, 2010, vol. 12(12): 1671-1673.

Mizrahi, O. et al., Electrolyte Solutions with a Wide Electrochemical Window for Rechargeable Magnesium Batteries, Journal of the Electrochemical Society, 2008, 155(2): A103-A109.

* cited by examiner

*Primary Examiner* — Mark Kopec
*Assistant Examiner* — Matthew R Diaz
(74) *Attorney, Agent, or Firm* — Cantor Colburn LLP

(57) ABSTRACT

An organic electrolyte for magnesium batteries including an ether solvent; a magnesium compound represented by Formula 1 dissolved in the ether solvent; and a Lewis acid:

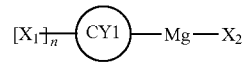

Formula 1 wherein CY1 is an optionally substituted C6-C50 aromatic ring, $X_1$ is, each independently, an electron withdrawing group, $X_2$ is a halogen, n is an integer of 1 to 10, and an angle between a $CY1$-$X_1$ bond and a $CY1$-$Mg$ bond is 150 degrees or less.

19 Claims, 3 Drawing Sheets

ORGANIC ELECTROLYTE FOR MAGNESIUM BATTERIES AND MAGNESIUM BATTERY USING THE ORGANIC ELECTROLYTE

CROSS-REFERENCE TO RELATED APPLICATIONS

This application claims priority to and the benefit of Korean Patent Application No. 10-2012-0075179, filed on Jul. 10, 2012, and all the benefits accruing therefrom under 35 U.S.C. §119, the content of which is incorporated herein in its entirety by reference.

BACKGROUND

1. Field

The present disclosure relates to an organic electrolyte for magnesium batteries and a magnesium battery including the organic electrolyte.

2. Description of the Related Art

As portable electronic devices such as video cameras, cellular phones, and notebook computers have become more lightweight and have improved in terms of performance, research into batteries with high capacity and high energy density used as power supplies for such portable electronic devices is being actively conducted.

Lithium batteries are commercially used as they have three times the energy density per unit weight compared to conventional lead storage batteries, nickel-cadmium batteries, nickel-hydrogen batteries, nickel-zinc batteries, and the like, and can be rapidly charged.

A lithium battery is manufactured with a battery case enclosing an anode formed of a carbonaceous material capable of intercalating/deintercalating lithium ions, a cathode formed of a lithium-containing oxide, and a non-aqueous electrolyte including an appropriate amount of a lithium salt in a mixed organic solvent.

However, the lithium battery has stability problems due to side reactions of the electrolyte and high reactivity of lithium. In addition, lithium is an expensive metal, so the cost of the lithium battery is usually high.

In contrast, magnesium batteries are environmentally friendly, relatively inexpensive, and have good energy storage characteristics. Due to these attractive features, research into different types of magnesium batteries such as a medium to large-sized battery used for power storage, electrical vehicles, or the like is being actively pursued.

However, when a cathode active material with a high oxidation/reduction potential is used in a magnesium battery, a side reaction of decomposition due to oxidation of the organic electrolyte may occur, thus limiting a driving voltage of the magnesium battery.

Accordingly, a magnesium battery including an organic electrolyte that is stable even at high voltages is desired.

SUMMARY

Provided is an organic electrolyte for magnesium batteries having an increased oxidation potential.

Provided is a magnesium battery including the organic electrolyte.

Additional aspects will be set forth in part in the description which follows and, in part, will be apparent from the description, or may be learned by practice of the presented embodiments.

According to an aspect of the present disclosure, an organic electrolyte for magnesium batteries includes an ether solvent; a magnesium compound represented by Formula 1 below and dissolved in the ether solvent; and a Lewis acid:

Formula 1

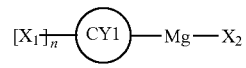

wherein CY1 is an optionally substituted C6-C50 aromatic ring, $X_1$ is, each independently, an electron withdrawing group, $X_2$ is a halogen, n is an integer of 1 to 10, and an angle between a CY1-$X_1$ bond and a CY1-Mg bond is 150 degrees or less.

According to another aspect of the present disclosure, a magnesium battery includes the organic electrolyte for magnesium batteries; a cathode, and an anode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
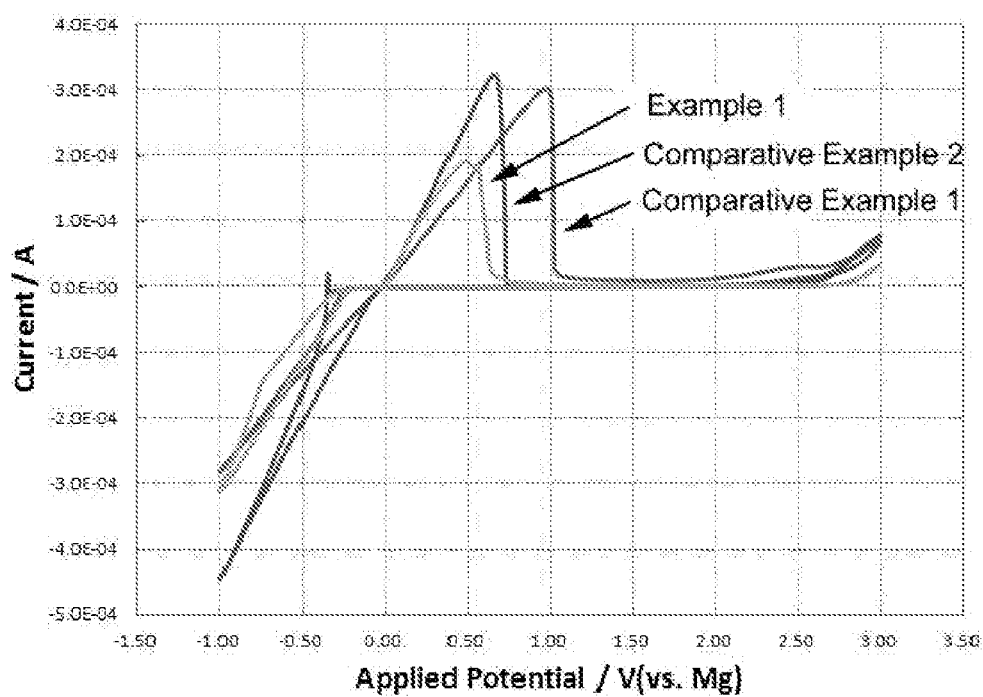
FIG. 1 is a graph of current (Ampere, A) versus applied potential versus magnesium (Mg) (Volts, V) showing a cyclic voltammogram of organic electrolytes prepared in Comparative Examples 1 to 2 and Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of at least one of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Alkyl" as used herein means a monovalent group derived from a straight or branched chain saturated aliphatic hydrocarbon having the specified number of carbon atoms.

"Aryl" as used herein means a monovalent group derived from a cyclic hydrocarbon wherein all ring members are carbon and at least one ring is aromatic, and having the specified number of carbon atoms.

Hereinafter, an organic electrolyte for magnesium batteries and a magnesium battery including the organic electrolyte according to an embodiment of the present disclosure will be described in greater detail.

An organic electrolyte for magnesium batteries according to an embodiment of the present disclosure includes an ether solvent; a magnesium compound, which is represented by Formula 1 below, dissolved in the ether solvent; and a Lewis acid:

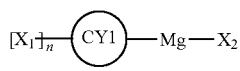

Formula 1

In Formula 1, CY1 is an optionally substituted C6-C50 aromatic ring, $X_1$ is, each independently, an electron withdrawing group, $X_2$ is a halogen, n is an integer of 1 to 10, and an angle between a CY1-$X_1$ bond an a CY1-Mg bond is 150 degrees or less. That is, an angle between a straight line connecting the carbon atom of the CY1 fragment bound to $X_1$ to the geometric center of the minimum size aromatic ring with the carbon and a straight line connecting the carbon atom of the CY1 fragment bound to $X_2$ to the geometric center of the aromatic ring is 150 degrees or less.

In the organic electrolyte for magnesium batteries, a negative charge present on the aromatic ring may be further stabilized by the electron withdrawing group attached to the carbon atom of the CY1 fragment when an angle between the CY1-$X_1$ bond and the CY1-Mg bond is in a range of 150 degrees to 210 degrees. Accordingly, at the foregoing arrangement of the CY1-$X_1$ and CY1-Mg bonds, side reactions of the organic electrolyte for magnesium batteries may be suppressed even at a relatively increased oxidation potential.

The organic electrolyte for magnesium batteries is prepared by adding and dissolving the magnesium compound and the Lewis acid in an ether solvent. The magnesium compound may form a stable structure by being coordinated to the Lewis acid and/or the organic solvent, and as a result, an oxidation potential of the organic electrolyte may be increased.

For example, the electron withdrawing group may be a halogen, —$CF_3$, —$CCl_3$, —$NO_2$, —$C(=O)OR$, —$S(=O)_2CF_3$, —$S(=O)_2C_2F_5$, —$S(=O)_2OR$, or —CN, wherein R is a linear or branched C1-C10 alkyl group or C6-C10 aryl group, but is not limited thereto, so any electron withdrawing group known in the art capable of increasing an oxidation potential of the magnesium compound may be used.

The ether solvent denotes a compound including an ether group (—O—), and the aromatic ring denotes a ring system that is stabilized due to electron delocalization. The aromatic ring may include a system of two or more rings that are combined or fused to each other. A substituent attached to the aromatic ring system may be the electron withdrawing group described above.

In the organic electrolyte for magnesium batteries, the magnesium compound may be represented by Formula 2 below:

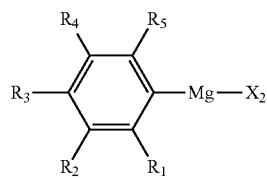

Formula 2

In Formula 2, $X_2$ is a halogen, $R_3$ is a hydrogen, a C1-C20 alkyl group or a C6-C20 aryl group, $R_1$, $R_2$, $R_4$, and $R_5$ are, each independently, a hydrogen; a halogen; —$CF_3$; —$CCl_3$; —$NO_2$; —$C(=O)OR$; —$S(=O)_2CF_3$; —$S(=O)_2C_2F_5$; —$S(=O)_2OR$; —CN; a C1-C20 alkyl group optionally substituted with a halogen, —$CF_3$, —$CCl_3$, —$NO_2$, —$C(=O)OR$, —$S(=O)_2CF_3$, —$S(=O)_2C_2F_5$, —$S(=O)_2OR$, or —CN; or a C6-C20 aryl group optionally substituted with a halogen, —$CF_3$, —$CCl_3$, —$NO_2$, —$C(=O)OR$, —$S(=O)_2CF_3$, —$S(=O)_2C_2F_5$, —$S(=O)_2OR$, or —CN, wherein R is a linear or branched C1-C10 alkyl group, or C6-C10 aryl group, and at least one of $R_1$, $R_2$, $R_4$, and $R_5$ includes a halogen, —$CF_3$, —$CCl_3$, —$NO_2$, —$C(=O)OR$, —$S(=O)_2CF_3$, —$S(=O)_2C_2F_5$, —$S(=O)_2OR$, or —CN.

In the organic electrolyte for magnesium batteries, the magnesium compound may be represented by Formula 3 below:

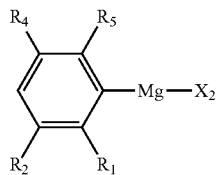

Formula 3

In Formula 3, $X_2$ is a halogen, $R_1$, $R_2$, $R_4$, and $R_5$ are, each independently, a hydrogen; a halogen; —$CF_3$; —$CCl_3$; —$NO_2$; —$C(=O)OR$; —$S(=O)_2CF_3$; —$S(=O)_2C_2F_5$; —$S(=O)_2OR$; —CN; a C1-C20 alkyl group optionally substituted with a halogen, —$CF_3$, —$CCl_3$, —$NO_2$, —$C(=O)OR$, —$S(=O)_2CF_3$, —$S(=O)_2C_2F_5$, —$S(=O)_2OR$, or —CN; or a C6-C20 aryl group optionally substituted with a halogen, —CF$_3$, —CCl$_3$, —NO$_2$, —C(=O)OR, —S(=O)$_2$CF$_3$, —S(=O)$_2$C$_2$F$_5$, —S(=O)$_2$OR, or —CN, wherein R is a linear or branched C1-C10 alkyl group, or C6-C10 aryl group, and at least one of $R_1$, $R_2$, $R_4$, and $R_5$ includes a halogen, —CF$_3$, —CCl$_3$, —NO$_2$, —C(=O)OR, —S(=O)$_2$CF$_3$, —S(=O)$_2$C$_2$F$_5$, —S(=O)$_2$OR, or —CN.

In the organic electrolyte for magnesium batteries, the magnesium compound may be represented by Formula 4 below:

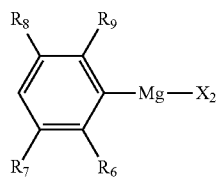

Formula 4

In Formula 4, $X_2$ is a halogen, $R_6$, $R_7$, $R_8$, and $R_9$ are, each independently, a hydrogen or a halogen, but at least one of $R_6$, $R_7$, $R_8$, and $R_9$ is a halogen.

The organic electrolyte for magnesium batteries may further include at least one magnesium compound selected from of R'MgX (wherein R' is a linear or branched C1-C10 alkyl group, C6-C10 aryl group, or a linear or branched C1-C10 amine group, and X is a halogen), Mg(X)$_2$ (wherein X is a halogen), R''$_2$Mg (wherein R'' is a C1-C10 alkyl group, a C1-C10 dialkylboron group, a C6-C12 diarylboron group, a C1-C10 alkylcarbonyl group, or a C1-C10 alkylsulfonyl group), MgClO$_4$, or the magnesium compound represented by any of Formulae 1 through 4.

In the organic electrolyte for magnesium batteries, the Lewis acid may include at least one selected from AlCl$_3$, Al(CH$_3$)$_3$, AlH$_3$, Al(OR)$_3$ (wherein R is a linear or branched C1-C10 alkyl group or C6-C10 aryl group), Al$^{3+}$, BF$_3$, BCl$_3$, B(OR)$_3$ (wherein R is a linear or branched C1-C10 alkyl group or C6-C10 aryl group), R—C≡O$^+$, NC$^+$, CO$_2$, R$_3$Si$^+$ (wherein R is a linear or branched C1-C10 alkyl group or C6-C10 aryl group), Si$^{4+}$, RPO$^{2+}$ (wherein R is a linear or branched C1-C10 alkyl group or C6-C10 aryl group), ROPO$^{2+}$ (wherein R is a linear or branched C1-C10 alkyl group or C6-C10 aryl group), As$^{3+}$, RSO$^{2+}$ (wherein R is a linear or branched C1-C10 alkyl group or C6-C10 aryl group), ROSO$^{2+}$ (wherein R is a linear or branched C1-C10 alkyl group or C6-C10 aryl group), SO$_3$, Se$^{3+}$, Cl$^{7+}$, I$^{7+}$, I$^{5+}$, Li$^+$, Na$^+$, K$^+$, Be(CH$_3$)$_2$, Be$^{2+}$, Ca$^{2+}$, Sr$^{2+}$, Ga(CH$_3$)$_3$, Ga$^{3+}$, In(CH$_3$)$_3$, In$^{3+}$, SnR$^{3+}$ (wherein R is a linear or branched C1-C10 alkyl group or C6-C10 aryl group), Sn(CH$_3$)$^{2+}$, Sn$^{2+}$, Sc$^{3+}$, La$^{3+}$, Ti(OR)$_4$ (wherein R is a linear or branched C1-C10 alkyl group or C6-C10 aryl group), Ti$^{4+}$, Zr$^{4+}$, VO$^{2+}$, Cr$^{3+}$, Fe$^{3+}$, Co$^{3+}$, Ir$^{3+}$, Th$^{4+}$, UO$_2^{2+}$, Pu$^{4+}$, and Tb$^{3+}$.

For example, the Lewis acid may be at least one selected from AlCl$_3$ and BF$_3$.

In the organic electrolyte for magnesium batteries, the ether solvent may be represented by any of Formulae 5 through 11 below:

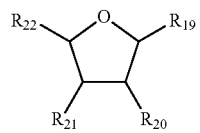

Formula 5

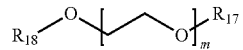

Formula 6

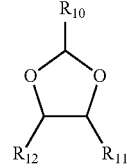

Formula 7

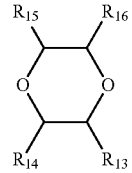

Formula 8

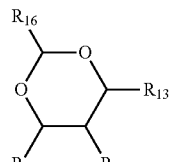

Formula 9

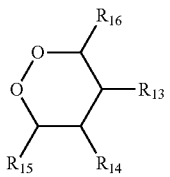

Formula 10

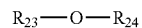

Formula 11

In Formulae 5 through 11, m is an integer of 1 to 20, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, and $R_{24}$ are, each independently, a C1-C5 alkyl group optionally substituted with a halogen. The halogen may be one or more selected from F, Cl, Br, and I.

For example, the ether solvent may be tetrahydrofuran.

The organic electrolyte for magnesium batteries may further include at least one organic solvent selected from dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), ethylene carbonate ("EC"), propylene carbonate ("PC"), butylene carbonate ("BC"), methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethyleneglycoldimethylether, diethyleneglycol dimethylether, dimethoxyethane, tetrahydrofuran, 2-methyltetrahydrofuran, 2,2-dimethyltetrahydrofuran, 2,5-dimethyltetrahydrofuran, cyclohexanone, triethylamine, triphenylamine, triethylphosphineoxide, acetonitrile, dimethylformamide, 1,3-dioxolane, or sulfolane, but is not limited thereto.

In the organic electrolyte for magnesium batteries, an amount of the magnesium compound may be in a range of about 0.1 M to about 10 M. When an amount of the magnesium compound is too low, a conductivity of magnesium ions may be low, and when an amount of the magnesium compound is too high, a viscosity of the electrolyte may increase, so formation of a conventional electrode/electrolyte interface may be difficult.

In the organic electrolyte for magnesium batteries, an amount of the Lewis acid may be in a range of about 0.001 M to about 10 M. When an amount of the Lewis acid is too low, anions in the electrolyte may be electrochemically unstabilized, and when an amount of the Lewis acid is too high, reactivity with air and reactivity with a metal such as a current collector in a battery may be increased.

A molar ratio of the magnesium compound to the Lewis acid in the organic electrolyte for magnesium batteries may be about 1:5 to about 1:0.001. When an amount of the Lewis acid is too high compared to an amount of the magnesium compound, reactivity with air and reactivity with a metal such as a current collector in a battery may be rapidly increased, and when an amount of the magnesium compound is too low compared to an amount of the magnesium compound, stability of anions in the electrolyte may be decreased.

An oxidation potential of the organic electrolyte for magnesium batteries to magnesium with respect to magnesium may be 2.60 Volts ("V") or greater. In an embodiment, an oxidation potential of the organic electrolyte for magnesium batteries with respect to magnesium may be 2.70 V or greater. In another embodiment, an oxidation potential of the organic electrolyte for magnesium batteries with respect to magnesium may be 2.80 V or greater. As an oxidation potential of the organic electrolyte with respect to magnesium increases, a driving voltage of a magnesium battery including the organic electrolyte may increase, and as a result, energy density of the magnesium battery may also increase.

A magnesium battery according to another embodiment of the present disclosure may include the organic electrolyte for magnesium batteries; a cathode; and an anode.

The magnesium battery may be prepared as follows.

First, a cathode is prepared.

In an embodiment, a cathode active material, a conductive material, a binder, and a solvent may be mixed to prepare a cathode active material composition. Then, the cathode active material composition may be directly coated on a metal current collector to prepare a cathode plate. Alternatively, the cathode active material composition may be cast on a separate support to form a film, and the film, separated from the support, may be laminated on a metal current collector to prepare a cathode plate. A type of the cathode is not limited to the cathode plates listed above and may be a different type of cathode plate.

The cathode active material included in the cathode may be at least one selected from a magnesium composite metal oxide and at least one selected from an oxide, sulfide, or halide of a metal selected from scandium (Sc), ruthenium (Ru), titanium (Ti), vanadium (V), molybdenum (Mo), chromium (Cr), manganese (Mn), iron (Fe), cobalt (Co), nickel (Ni) copper (Cu), and zinc (Zn).

For example, the cathode active material may be $TiS_2$, $ZrS_2$, $RuO_2$, $Co_3O_4$, $Mo_6S_8$, or $V_2O_5$, but is not limited thereto. Also, the magnesium composite metal oxide may be a magnesium compound that is represented as $Mg(M_{1-x}A_x)O_4$ (where $0 \leq x \leq 0.5$, M is Ni, Co, Mn, Cr, V, Fe, Cu, or Ti, and A is Al, B, Si, Cr, V, C, Na, K, or Mg).

The conductive material may be carbon black, or graphite granules, but is not limited thereto, and any conductive material available in the art may be used.

The binder may be a vinylidene fluoride/hexafluoropropylene copolymer, polyvinylidene fluoride ("PVDF"), polyacrylonitrilie, polymethylmethacrylate, polytetrafluoroethylene, and a combination thereof, or styrene butadiene rubber-based polymer, but is not limited thereto, and any binder available in the art may be used.

The solvent may be N-methylpyrrolidone ("NMP"), acetone, or water, but is not limited thereto, and any solvent available in the art may be used.

Amounts of the cathode active material, the conductive material, the binder, and the solvent, are those commonly used in a magnesium battery. At least one of the conductive material, the binder, and the solvent may be omitted depending on usage and structure of a magnesium battery.

Next, an anode is prepared.

The anode in the magnesium battery may include at least one of a magnesium metal, a magnesium-based alloy, and a magnesium intercalating compound, but is not limited thereto, and any material available as an anode active material that includes magnesium or that is capable of intercalating/deintercalating magnesium in the art may be used. The anode determines a capacity of the magnesium battery, thus the anode may be, for example, a magnesium metal. The magnesium metal-based alloy may be, for example, an alloy of magnesium with aluminum, tin, indium, calcium, titanium, or vanadium.

For example, the anode may be magnesium metal with a thickness in a range of about 3 micrometers ("μm") to about 500 μm. Further, the magnesium metal may be used in a variety of shapes such as a film, a sheet, a foil, a net, a porous body, a blowing agent, a non-woven fabric, or the like.

Then, a separator is prepared.

The magnesium battery may further include the separator disposed between the cathode and the anode.

The separator is not limited and may include any material which is durable in an environment where the magnesium battery is used. Thus, the separator may be porous, for example woven or non-woven fabric comprising glass fibers, fibers comprising a polypropylene material, or fibers comprising a polyphenylene sulfide material, or a porous film comprising an olefin polymer such as polyethylene or polypropylene, and the like, and a combination thereof.

Also, the separator may be a solid layer with low resistance to electrolyte ion transfer and excellent electrolyte retainability. For example, the separator may be polyester, polyethylene, polypropylene, polytetrafluoroethylene ("PTFE", e.g., TEFLON), and a combination thereof. Each of the foregoing materials may also be in the form of fibers provided as a non-woven or woven fabric.

For example, the solid separator may be manufactured in the following manner.

A polymer resin, a filler, and a solvent may be mixed to prepare a separator composition. Then, the separator composition may be directly coated on an anode active material layer and dried to form the separator. Alternatively, the separator composition may be cast on a support and dried to form a separator film, and the separator film, separated from the support, may be laminated on an anode active material layer to form the separator.

The polymer resin used to manufacture the separator is not particularly limited and may be any material that is commonly used as a binder for electrode plates. For example, the polymer resin may be polyethylene, polypropylene, vinylidenefluoride/hexafluoropropylene copolymer, polyvinylidene fluoride ("PVDF"), polyacrylonitrile, polymethylmethacrylate, or a mixture thereof. The separator may comprise a filler. The filler used to manufacture the separator may comprise inorganic particles or the like, and the solvent may be any solvent that is capable of dissolving the polymer resin and capable of forming pores in the polymer resin during a drying process and is commonly used in the art.

Alternatively, the separator may be separately manufactured and may be laminated on the anode active material layer. For example, a dry method for forming a microporous membrane may be used, wherein polypropylene and polyethylene may be melted and extruded to prepare a film, and then the film may be annealed at a low temperature to grow crystalline domains. Then, the crystalline domains may be stretched to extend amorphous regions. Also, for example, a wet method for forming a microporous membrane may be used, wherein a hydrocarbon solvent and/or other small molecule materials are combined with polypropylene, polyethylene, and the like to form a film, and subsequently, the solvent and the small molecules may be removed from the film by using another volatile solvent, while the solvent or the small molecules, gathered in the amorphous phases, start forming an island phase within the film.

Also, the separator may further include an additive, such as non-conductive particles, other fillers, or a fiber compound to control a degree of strength or hardness and thermal shrinkage. For example, the separator may further include inorganic particles. Thus, the oxidation resistance of the separator may be improved and the degradation of battery characteristics may be suppressed. The inorganic particles may include a metal oxide, such as one or more selected from alumina ($Al_2O_3$), silica ($SiO_2$), or titania ($TiO_2$). An average particle diameter of the inorganic particles may be in the range of about 10 nanometers ("nm") to about 5 μm, for example about 100 nm to about 1 μm. When an average particle diameter is less than 10 nm, the crystallinity of the inorganic particles may be deteriorated, and thus the effect of addition of the inorganic particles may be negligible. However, when an average particle diameter is greater than 5 μm, the dispersion of the inorganic particles may be difficult.

The separator may have a multi-layer structure including one or more polymer layers to increase a tearing strength or a mechanical strength. Examples of the structure of the separator may be a laminated structure of one or more selected from polyethylene/polypropylene, a laminated structure of polyethylene/polypropylene/polyethylene, and a laminated structure of non-woven fabric/polyolefin.

Next, the organic electrolyte is prepared.

The magnesium compound of any of Formula 1 to 4 and the Lewis acid are added, mixed, and dissolved in the ether solvent to prepare the organic electrolyte.

Figure 3:
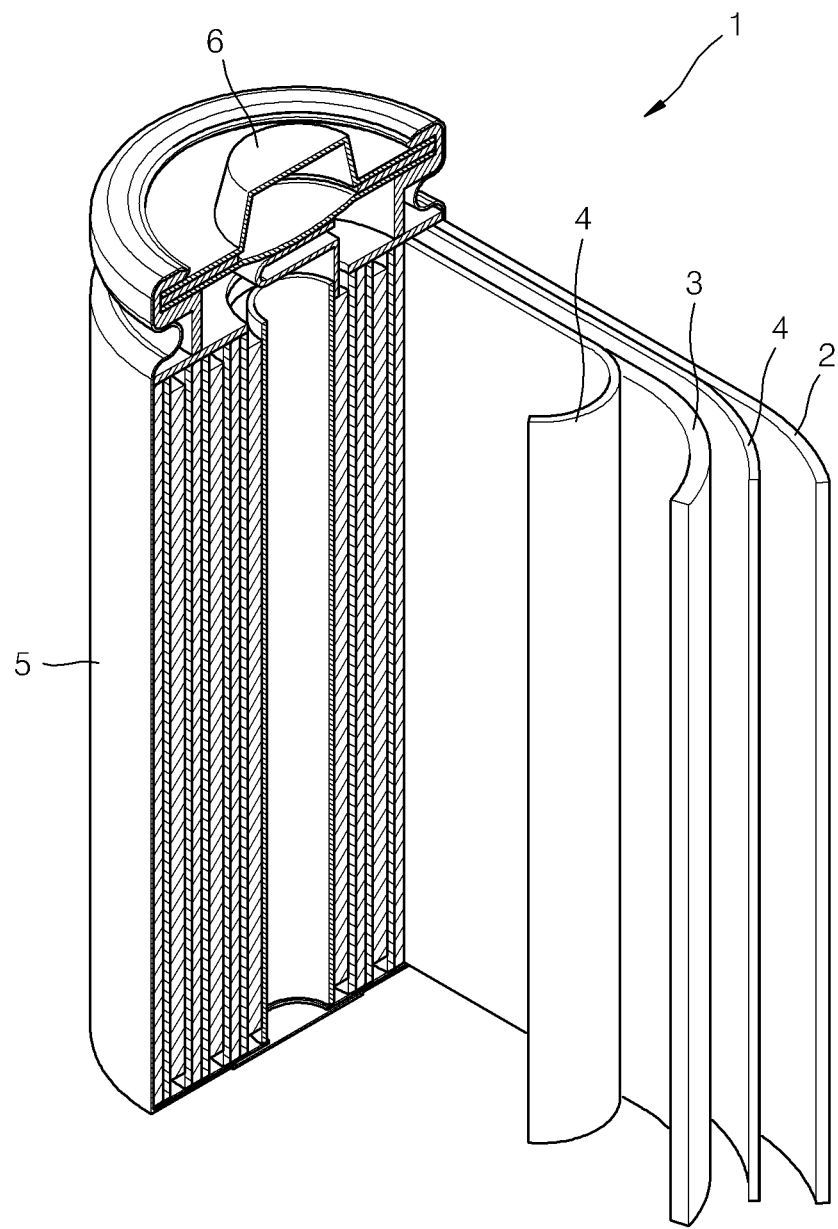
FIG. 3 is a schematic view of an exemplary magnesium battery according to an embodiment of the present disclosure.

As shown in FIG. 3, a magnesium battery 1 includes a cathode 3, an anode 2, and a separator 4. The cathode 3, anode 2, and separator 4 may be wound or folded to be enclosed in a battery case 5. Subsequently, the organic electrolyte is injected into the battery case 5 and then sealed with a cap assembly 6 to complete the magnesium battery 1. The battery case 5 may have a shape like a cylinder, a box, or a thin-film. For example, the magnesium battery may be a large thin-film battery. The magnesium battery may be a magnesium ion battery.

The separator is interposed between the cathode plate and the anode plate to form a battery assembly. The battery assembly is prepared in the form of a bicell structure, and the organic electrolytic solution according to an embodiment of the present disclosure is impregnated therein. Then, the resulting structure is placed in a pouch and sealed to complete the magnesium polymer battery.

Also, a plurality of the battery assemblies may be stacked to form a battery pack, and the battery pack may be used in every device that requires high capacity. For example, the battery pack may be used in a laptop, a smart phone, an electrical vehicle ("EV"), or the like.

Moreover, the magnesium battery has excellent storage stability and thermal stability and thus may be used in an energy storage system ("ESS") and an EV. For example, the magnesium battery may be used in a hybrid vehicle, such as a plug-in hybrid electric vehicle ("PHEV").

The present disclosure will now be described in greater detail with reference to the following examples. However, the following examples are for illustrative purposes only and are not intended to limit the scope of the invention.

Preparation Of Organic Electrolyte

EXAMPLE 1

$AlCl_3$ was slowly added to anhydrous tetrahydrofuran ("THF") and stirred until the concentration reached 0.5 molar ("M") to prepare a first solution. A 2 M 3-fluorophenylmagnesium bromide (3-$FC_6H_4MgBr$, available from Aldrich) solution dissolved in anhydrous THF was prepared as a second solution.

The first solution and the second solution were mixed at a volume ratio of 1:2 to prepare an organic electrolyte for magnesium batteries, and anhydrous THF was added to the mixture to make a final concentration of 3-$FC_6H_4MgBr$ in the organic electrolyte to be 0.5 M.

EXAMPLE 2

A $BF_3$-THF complexing agent (available from Aldrich) is used as a first solution. A 2M 3-fluorophenylmagnesium bromide (3-$FC_6H_4MgBr$, available from Aldrich) solution dissolved in anhydrous THF was prepared as a second solution.

An organic electrolyte for magnesium battery was prepared in the same manner as in Example 1, except that the first solution and the second solution were mixed at a volume ratio of 1:1.

EXAMPLE 3

$AlCl_3$ was slowly added to anhydrous THF and stirred until the concentration reached 0.5 M to prepare a first solution. A 0.5 M 3,5-difluorophenylmagnesium bromide (available from Aldrich) solution dissolved in anhydrous THF was prepared as a second solution.

An organic electrolyte for magnesium battery was prepared in the same manner as in Example 1, except that first solution and the second solution were mixed at a volume ratio of 1:2.

EXAMPLE 4

$AlCl_3$ was slowly added to anhydrous THF and stirred until the concentration reached 0.5 M to prepare a first solution. A 0.5 M 3,5-bis(trifluoromethyl)phenylmagnesium bromide (available from Aldrich) solution dissolved in anhydrous THF was prepared as a second solution.

An organic electrolyte for magnesium battery was prepared in the same manner as in Example 1, except that the first solution and the second solution were mixed at a volume ratio of 1:2.

EXAMPLE 5

A $BF_3$-THF complexing agent (available from Aldrich) was used as a first solution. A 0.5 M 3,5-bis(trifluoromethyl)

phenylmagnesium bromide (available from Aldrich) solution dissolved in anhydrous THF was prepared as a second solution.

An organic electrolyte for magnesium battery was prepared in the same manner as in Example 1, except that the first solution and the second solution were mixed at a volume ratio of 1:4.

COMPARATIVE EXAMPLE 1

$AlCl_3$ was slowly added to anhydrous THF and stirred until the concentration reached 0.5 M to prepare a first solution. A 2 M phenylmagnesium bromide (PhMgBr, available from Aldrich) solution dissolved in anhydrous THF was prepared as a second solution.

The first solution and the second solution were mixed at a volume ratio of 1:2 to prepare an organic electrolyte for magnesium batteries, and anhydrous THF was added to the mixture to make a final concentration of PhMgBr in the organic electrolyte to be 0.5 M.

COMPARATIVE EXAMPLE 2

$AlCl_3$ was slowly added to anhydrous THF and stirred until the concentration reached 0.5 M to prepare a first solution. A 2 M 4-fluorophenylmagnesium bromide (4-$FC_6H_4MgBr$, available from Aldrich) solution dissolved in anhydrous THF was prepared as a second solution.

The first solution and the second solution were mixed at a volume ratio of 1:2 to prepare an organic electrolyte for magnesium batteries, and anhydrous THF was added to the mixture to make a final concentration of 4-$FC_6H_4MgBr$ in the organic electrolyte to be 0.5 M.

Manufacture of Magnesium Battery

EXAMPLE 6

A cathode active material slurry was prepared by adding and mixing $Mo_6S_8$ as a cathode, Denka black as a conductive material, and a polyvinylidene fluoride ("PVDF") as a binder at a weight ratio of 80:10:10 in a N-methylpyrrolidone ("NMP"). Then, the cathode active material slurry was coated on a stainless steel ("SUS") foil with a thickness of 10 μm and dried to prepare a cathode plate.

The cathode plate was used to prepare a coin cell.

When the coin cell was prepared, a magnesium foil with a thickness of 100 μm was used as an anode, a polyethylene separator (Asahi Kasei, Japan, Star® 20) with a thickness of 20 μm was used as a separator, and the organic electrolyte prepared in Example 1 was used as an electrolyte.

EXAMPLES 7 to 10

A magnesium battery was prepared in the same manner as in Example 6, except that the organic electrolytes prepared in Examples 2 to 5 were used, respectively.

COMPARATIVE EXAMPLES 3 to 4

A magnesium battery was prepared in the same manner as in Example 6, except that the organic electrolytes prepared in Comparative Examples 1 to 2 were used, respectively.

EVALUATION EXAMPLE 1

Evaluation of Oxidation Potential

Oxidation potentials of the organic electrolytes prepared in Examples 1 to 5 and Comparative Examples 1 to 2 were measured at a room temperature (25° C.) using a potentiometer (available from Solartron, model no.: 1287 ECI), to obtain a cyclic voltammogram. Working electrode was scanned at a speed of 10 millivolts per second ("mV/sec") within a voltage range from about −1.0 V to about 3.0 V with respect to a magnesium (Mg) metal.

A platinum (Pt) disc electrode was used as a working electrode, and Mg foils are used as a reference electrode and a counter electrode.

Figure 2:
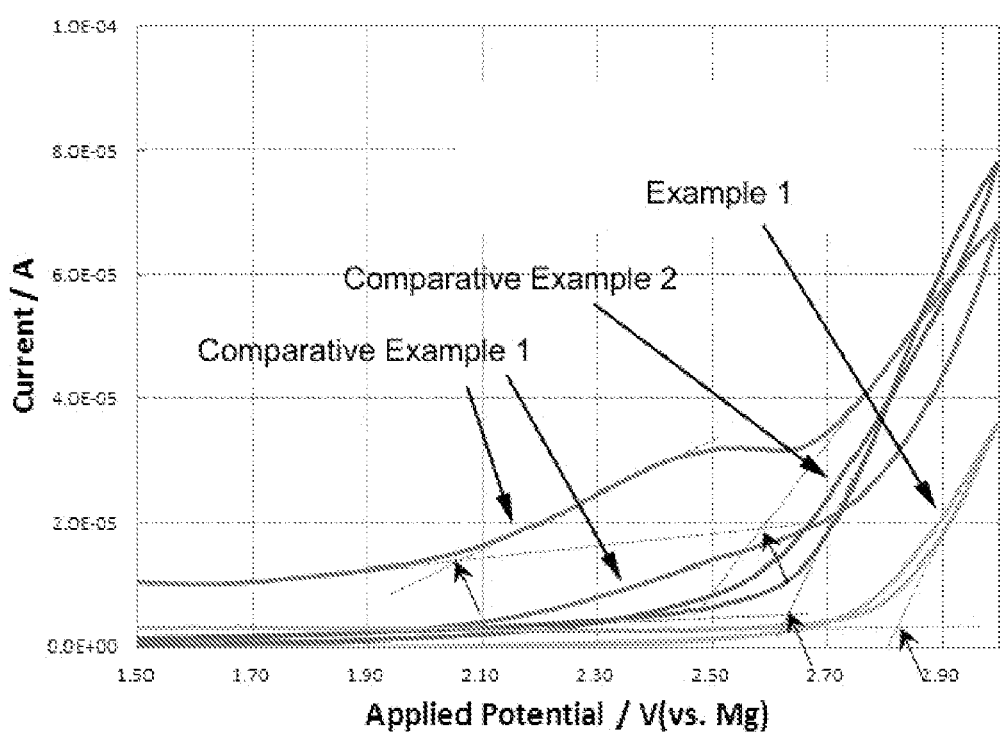
FIG. 2 is a magnified view of a section of the cyclic voltammogram shown in FIG. 1.

Some of the results are shown in FIGS. 1 to 3 and Table 1 below.

TABLE 1

|  | oxidation potential [$V_{Mg/Mg2+}$] |
|---|---|
| Comparative Example 1 | 2.05, 2.58 |
| Comparative Example 2 | 2.63 |
| Example 1 | 2.82 |

As shown in Table 1 and FIG. 2, the organic electrolyte of Example 1 had increased oxidation potential compared to the organic electrolytes of Comparative Examples 1 to 2. Therefore, it was determined that energy density may be increased as a driving voltage of the magnesium battery including the organic electrolyte increases.

As described above, energy density of a magnesium battery may be increased by using an organic electrolyte for magnesium batteries according to the at least one of the above embodiments of the present disclosure.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An organic electrolyte for magnesium batteries comprising:
   an ether solvent;
   a magnesium compound represented by Formula 1 and dissolved in the ether solvent; and
   a Lewis acid:

Formula 1

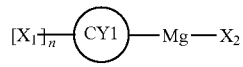

wherein CY1 is a substituted C6-C50 aromatic ring, $X_1$ is, each independently, an electron withdrawing group, $X_2$ is a halogen, n is an integer of 1 to 10, and an angle between a straight line connecting the carbon atom of the CY1 fragment bound to $X_1$ to the geometric center of the aromatic ring system and a straight line connecting the carbon atom of the CY1 fragment bound to $X_2$ to the geometric center of the aromatic ring system is 150 degrees or less, wherein the electron withdrawing group is —F, —$CF_3$, —$CCl_3$, —$NO_2$, —C(=O)OR, —S(=O)$_2$$CF_3$, —S(=O)$_2$$C_2F_5$, —S(=O)$_2$OR, or —CN, where R is a linear or branched C1-C10 alkyl group or C6-C10 aryl group.

2. The organic electrolyte for magnesium batteries of claim 1, wherein the magnesium compound is represented by Formula 2:

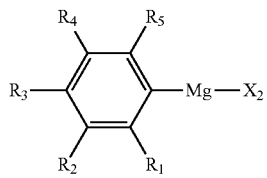

Formula 2 wherein $X_2$ is a halogen, $R_3$ is a hydrogen, a C1-C20 alkyl group, or a C6-C20 aryl group, $R_1$, $R_2$, $R_4$, and $R_5$ are, each independently, a halogen, —$CF_3$; —$CCl_3$; —$NO_2$; —C(=O)OR; —S(=O)$_2$CF$_3$; —S(=O)$_2$C$_2$F$_5$; —S(=O)$_2$OR; —CN; a C1-C20 alkyl group optionally substituted with a halogen, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN; or a C6-C20 aryl group optionally substituted with a halogen, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN, wherein R is a linear or branched C1-C10 alkyl group or C6-C10 aryl group, and at least one of $R_1$, $R_2$, $R_4$, and $R_5$ is $X_1$ that comprises —F, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN.

3. The organic electrolyte for magnesium batteries of claim 1, wherein the magnesium compound is represented by Formula 3:

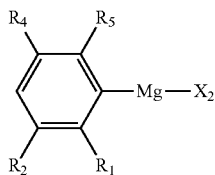

Formula 3 wherein $X_2$ is a halogen, $R_1$, $R_2$, $R_4$, and $R_5$ are, each independently, a hydrogen; a halogen; —$CF_3$; —$CCl_3$; —$NO_2$; —C(=O)OR; —S(=O)$_2$CF$_3$; —S(=O)$_2$C$_2$F$_5$; —S(=O)$_2$OR; —CN; a C1-C20 alkyl group optionally substituted with a halogen, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN; or a C6-C20 aryl group optionally substituted with a halogen, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN, wherein R is a linear or branched C1-C10 alkyl group, or C6-C10 aryl group, and at least one of $R_1$, $R_2$, $R_4$, and $R_5$ is $X_1$ that comprises —F, —$CF_3$, —$CCl_3$, —$NO_2$, —C(=O)OR, —S(=O)$_2$CF$_3$, —S(=O)$_2$C$_2$F$_5$, —S(=O)$_2$OR, or —CN.

4. The organic electrolyte for magnesium batteries of claim 1, wherein the magnesium compound is represented by Formula 4:

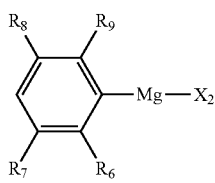

Formula 4 wherein $X_2$ is a halogen, $R_6$, $R_7$, $R_8$, and $R_9$ are, each independently, a hydrogen or a halogen, but at least one of $R_6$, $R_7$, $R_8$, and $R_9$ is $X_1$ that comprises —F.

5. The organic electrolyte for magnesium batteries of claim 1, wherein the organic electrolyte for magnesium batteries further comprises at least one magnesium compound selected from R'MgX (wherein R' is a linear or branched C1-C10 alkyl group, C6-C10 aryl group, or a linear or branched C1-C10 amine group, and X is a halogen), Mg(X)$_2$ (wherein X is a halogen), R"$_2$Mg (wherein R" is a C1-C10 alkyl group, a C1-C10 dialkylboron group, a C6-C12 diarylboron group, a C1-C10 alkylcarbonyl group, or a C1-C10 alkylsulfonyl group), and MgClO$_4$.

6. The organic electrolyte for magnesium batteries of claim 1, wherein the Lewis acid comprises at least one selected from AlCl$_3$, Al(CH$_3$)$_3$, AlH$_3$, Al(OR)$_3$ (wherein R is a linear or branched C1-C10 alkyl group or C6-C10 aryl group), Al$^{3+}$, BF$_3$, BCl$_3$, B(OR)$_3$ (wherein R is a linear or branched C1-C10 alkyl group or C6-C10 aryl group), R—C=O$^+$, NC$^+$, CO$_2$, R$_3$Si$^+$(wherein R is a linear or branched C1-C10 alkyl group or C6-C10 aryl group), Si$^{4+}$, RPO$^{2+}$(wherein R is a linear or branched C1-C10 alkyl group or C6-C10 aryl group), ROPO$^{2+}$(wherein R is a linear or branched C1-C10 alkyl group or C6-C10 aryl group), As$^{3+}$, RSO$^{2+}$(wherein R is a linear or branched C1-C10 alkyl group or C6-C10 aryl group), ROSO$^{2+}$(wherein R is a linear or branched C1-C10 alkyl group or C6-C10 aryl group), SO$_3$, Se$^{3+}$, Cl$^{7+}$, I$^{7+}$, I$^{5+}$, Li$^+$, Na$^+$, K$^+$, Be(CH$_3$)$_2$, Be$^{2+}$, Ca$^{2+}$, Sr$^{2+}$, Ga(CH$_3$)$_3$, Ga$^{3+}$, In(CH$_3$)$_3$, In$^{3+}$, SnR$^{3+}$(wherein R is a linear or branched C1-C10 alkyl group, or C6-C10 aryl group), Sn(CH$_3$)$^{2+}$, Sn$^{2+}$, Sc$^{3+}$, La$^{3+}$, Ti(OR)$_4$ (wherein R is a linear or branched C1-C10 alkyl group or C6-C10 aryl group), Ti$^{4+}$, Zr$^{4+}$, VO$^{2+}$, Cr$^{3+}$, Fe$^{3+}$, Co$^{3+}$, Ir$^{3+}$, Th$^{4+}$, UO$_2$$^{2+}$, Pu$^{4+}$, and Tb$^{3+}$.

7. The organic electrolyte for magnesium batteries of claim 1, wherein the Lewis acid is at least one selected from group AlCl$_3$ and BF$_3$.

8. The organic electrolyte for magnesium batteries of claim 1, wherein the ether solvent is represented by Formulae 5 through 11:

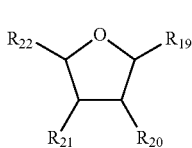

Formula 5

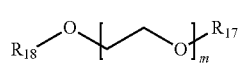

Formula 6

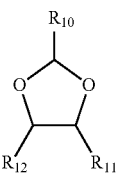

Formula 7

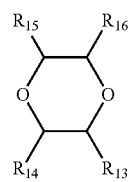

Formula 8

-continued

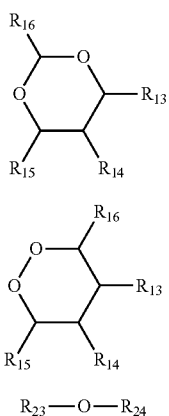

Formula 9

Formula 10

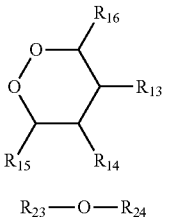

Formula 11

R_{23}—O—R_{24} wherein m is an integer of 1 to 20, and $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, and $R_{24}$ are, each independently, a C1-C5 alkyl group optionally substituted with a halogen.

9. The organic electrolyte for magnesium batteries of claim 1, wherein the ether solvent is tetrahydrofuran.

10. The organic electrolyte for magnesium batteries of claim 1, wherein the organic electrolyte further comprises at least one organic solvent selected from dimethyl carbonate, diethyl carbonate, ethyl methyl carbonate, dipropyl carbonate, methylpropyl carbonate, ethylpropyl carbonate, ethylene carbonate, propylene carbonate, butylene carbonate, methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethyleneglycoldimethylether, dimethoxyethane, 2-methyltetrahydrofuran, 2,2-dimethyltetrahydrofuran, 2,5-dimethyltetrahydrofuran, cyclohexanone, triethylamine, triphenylamine, triethylphosphineoxide, acetonitrile, dimethylformamide, 1,3-dioxolane, or sulfolane.

11. The organic electrolyte for magnesium batteries of claim 1, wherein an amount of the magnesium compound is in a range of about 0.1 M to about 10 M.

12. The organic electrolyte for magnesium batteries of claim 1, wherein an amount of the Lewis acid is in a range of about 0.001 M to about 10 M.

13. The organic electrolyte for magnesium batteries of claim 1, wherein a molar ratio of the magnesium compound to the Lewis acid dissolved in the organic electrolyte is in a range of about 1:1 to about 1:0.001.

14. The organic electrolyte for magnesium batteries of claim 1, wherein an oxidation potential of the organic electrolyte with respect to magnesium is 2.60 Volts or greater.

15. The organic electrolyte for magnesium batteries of claim 1, wherein an oxidation potential of the organic electrolyte with respect to magnesium is 2.70 Volts or greater.

16. A magnesium battery comprising:
the organic electrolyte for magnesium batteries of claim 1;
a cathode; and
an anode.

17. The magnesium battery of claim 16, wherein the anode in the magnesium battery comprises at least one selected from a magnesium metal, a magnesium-based alloy, and a magnesium intercalating compound.

18. The magnesium battery of claim 16, wherein the cathode is at least one selected from a magnesium composite metal oxide and at least one selected from an oxide, sulfide, or halide of at least one metal selected from scandium, ruthenium, titanium, vanadium, molybdenum, chromium, manganese, iron, cobalt, nickel, copper, and zinc.

19. The magnesium battery of claim 16 further comprising a separator disposed between the cathode and the anode.

* * * * *